US011669358B2

(12) United States Patent
Galvez et al.

(10) Patent No.: US 11,669,358 B2
(45) Date of Patent: Jun. 6, 2023

(54) VIRTUAL NETWORK FUNCTIONS ALLOCATION IN A DATACENTER

(71) Applicant: HEWLETT PACKARD ENTERPRISE DEVELOPMENT LP, Houston, TX (US)

(72) Inventors: Mario Garrido Galvez, Linköping (SE); Ignacio Aldama Perez, Las Rozas (ES); Jose Maria Alvarez Fernandez, Las Rozas (ES); David Severiano Herbada, Las Rozas (ES); Jorge Menendez Lopez, Las Rozas (ES); Javier Garcia Lopez, Las Rozas (ES); Ruben Sevilla Giron, Plano, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 176 days.

(21) Appl. No.: 16/985,739

(22) Filed: Aug. 5, 2020

(65) Prior Publication Data

US 2020/0371831 A1    Nov. 26, 2020

Related U.S. Application Data

(63) Continuation of application No. 15/665,022, filed on Jul. 31, 2017, now Pat. No. 10,768,963.

(51) Int. Cl.
*G06F 9/455* (2018.01)
*G06F 9/50* (2006.01)
*H04L 41/0893* (2022.01)

(52) U.S. Cl.
CPC ............ *G06F 9/45558* (2013.01); *G06F 9/50* (2013.01); *G06F 9/5077* (2013.01);
(Continued)

(58) Field of Classification Search
None
See application file for complete search history.

(56) References Cited

U.S. PATENT DOCUMENTS 9,301,026 B2    3/2016  Srinivas et al.
9,485,323 B1   11/2016  Stickle et al.
(Continued)

FOREIGN PATENT DOCUMENTS

CN      102710432 A    10/2012
CN      103649916 A     3/2014
(Continued)

OTHER PUBLICATIONS

Carpio, F. et al., "Vnf Placement with Replication for Loac Balancing in NFV Networks," IEEE, 2017, pp. 1-6.
(Continued)

*Primary Examiner* — Abu Zar Ghaffari
(74) *Attorney, Agent, or Firm* — Hewlett Packard Enterprise Patent Department (57) ABSTRACT

Virtual Network Functions (VNF) applies automation and virtualization techniques to move current network functions from dedicated hardware to general purpose hardware of an Information Technology (IT) infrastructure. A VNF may include one or more Virtual Machines (VM) and virtual networks which may implement the function of a network. Systems and methods provide a processing unit, a computation module and an allocation module for VNF allocation. The computation module is configured to determine an extinction factor corresponding to a datacenter unit based on a state of the datacenter and a VNF catalogue including a plurality of VNFs. The computation module is also configured to develop an allocation model based on the determined extinction factor. The allocation module is configured to
(Continued)

allocate a first VNF from the plurality of VNFs in the datacenter based on the allocation model.

20 Claims, 6 Drawing Sheets

(52) U.S. Cl.
CPC .............. *G06F 2009/4557* (2013.01); *G06F 2009/45562* (2013.01); *G06F 2009/45595* (2013.01); *H04L 41/0893* (2013.01)

(56) References Cited

U.S. PATENT DOCUMENTS

| | | | |
|---|---|---|---|
| 9,594,649 | B2 | 3/2017 | Yang et al. |
| 9,716,626 | B1 | 7/2017 | Herzog |
| 9,716,755 | B2* | 7/2017 | Borowiec ........... H04L 67/1001 |
| 9,806,979 | B1 | 10/2017 | Felstaine et al. |
| 9,853,869 | B1 | 12/2017 | Shaham et al. |
| 9,979,602 | B1* | 5/2018 | Chinnakannan ...... H04L 47/765 |
| 10,187,324 | B2 | 1/2019 | Yu et al. |
| 10,223,140 | B2* | 3/2019 | Xiang ................. H04L 41/5058 |
| 10,356,169 | B1 | 7/2019 | Mistry et al. |
| 10,361,915 | B2 | 7/2019 | Calo et al. |
| 10,469,359 | B2 | 11/2019 | Lee et al. |
| 2012/0226796 | A1 | 9/2012 | Morgan |
| 2014/0317293 | A1 | 10/2014 | Shatzkamer |
| 2015/0082308 | A1 | 3/2015 | Kiess et al. |
| 2016/0021024 | A1 | 1/2016 | Parikh |
| 2016/0043944 | A1* | 2/2016 | Felstaine ................. H04L 45/70 370/389 |
| 2016/0099860 | A1* | 4/2016 | Huang .................... H04L 45/70 370/389 |
| 2016/0103698 | A1 | 4/2016 | Yang et al. |
| 2016/0188357 | A1 | 6/2016 | Ahmad et al. |
| 2016/0246626 | A1 | 8/2016 | Kolesnik et al. |
| 2016/0246652 | A1 | 8/2016 | Herdrich et al. |
| 2016/0269319 | A1 | 9/2016 | Wise et al. |
| 2016/0344628 | A1 | 11/2016 | Hocker et al. |
| 2016/0359668 | A1 | 12/2016 | Udupi et al. |
| 2017/0063714 | A1 | 3/2017 | Xiang |
| 2017/0078216 | A1 | 3/2017 | Adolph et al. |
| 2017/0104609 | A1* | 4/2017 | Mcnamee ............... H04W 4/24 |
| 2017/0126792 | A1 | 5/2017 | Halpern et al. |
| 2017/0150399 | A1 | 5/2017 | Kedalagudde et al. |
| 2017/0192811 | A1 | 7/2017 | Kiess et al. |
| 2017/0237647 | A1 | 8/2017 | N et al. |
| 2017/0250870 | A1 | 8/2017 | Zhao |
| 2017/0257276 | A1 | 9/2017 | Chou et al. |
| 2017/0279668 | A1* | 9/2017 | Shevenell ............... H04L 69/40 |
| 2017/0279672 | A1* | 9/2017 | Krishnan ............ H04L 41/0803 |
| 2017/0318097 | A1 | 11/2017 | Drew et al. |
| 2018/0123943 | A1* | 5/2018 | Lee ......................... H04L 45/28 |
| 2018/0191607 | A1* | 7/2018 | Kanakarajan ........... H04L 45/04 |
| 2018/0288101 | A1* | 10/2018 | Sharma ................. H04L 9/3297 |
| 2018/0307539 | A1 | 10/2018 | Ceiozzi et al. |
| 2018/0321975 | A1 | 11/2018 | Bahramshahry et al. |
| 2018/0349202 | A1 | 12/2018 | Sharma et al. |
| 2018/0375726 | A1 | 12/2018 | Xia |
| 2019/0173803 | A1 | 6/2019 | Singh et al. |
| 2019/0230032 | A1 | 7/2019 | Landau et al. |

FOREIGN PATENT DOCUMENTS

| | | |
|---|---|---|
| CN | 104202264 A | 12/2014 |
| CN | 105049499 A | 11/2015 |
| EP | 3040860 A1 | 7/2016 |
| WO | WO-2016107862 A1 | 7/2016 |
| WO | WO-2017067616 A1 | 4/2017 |
| WO | WO-2017125161 A1 | 7/2017 |

OTHER PUBLICATIONS

Extended European Search Report received in EP Application No. 18186417.4, dated Dec. 12, 2018, 10 pages.

Fang, W. et al., "Joint Spectrum and It Resource Allocation for Efficient VNF Service Inter-Chaining in Inter-Datacenter Elastic Optical Networks," IEEE, Aug. 2016, pp. 1539-1542.

Yousaf, F. Z. et al., "RAVA—Resource Aware VNF Agnostic NFV Orchestration Method for Virtualized Networks," Jul. 3, 2016, NEC Laboratories Europe, pp. 2331-2336.

Gupta, P., "OpenStack Nova Scheduler," Jun. 20, 2013, 13 pages, es.slideshare.ne1/guptapeeyush1/presentation1-23249150.

Rankothge, W. et al., "Optimizing Resource Allocation for Virtualized Network Functions in a Cloud Center Using Genetic Algorithms," Jun. 2017, IEEE, pp. 343-356.

Wikipedia, "Knapsack Problem," May 1, 2017, 12 pages, en.wikipedia.org/w/index.php?title=Knapsack_problem&oldid= 77820195.

Herry, W., "OpenStack Nova-Scheduler and its Algorithm," May 12, 2012, 20 pages, williamherry.blogspot.com/2012/05/openstack-nova-scheduler-and-its.html.

* cited by examiner

VIRTUAL NETWORK FUNCTIONS ALLOCATION IN A DATACENTER

CROSS REFERENCE TO RELATED APPLICATIONS

This application is a continuation and claims the benefit, under 35 U.S.C. § 120, of U.S. patent application Ser. No. 15/665,022, filed on Jul. 31, 2017, issued as U.S. Pat. No. 10,768,963, filed on Jul. 31, 2017. The entire contents of the aforementioned applications are incorporated herein by reference.

BACKGROUND

Virtualization is a technology that enables execution of a plurality of applications via software on hardware devices. It may refer to the creation of virtual machines that behave like hardware with an operating system and allow applications to be executed therein. Some enterprises may use hardware, such as servers in a datacenter, to execute applications through a plurality of virtual machines allocated therein. As such, the allocation of the plurality of virtual machines in the servers of the datacenter may provide key value to enterprises, as the hardware computing resources may be used in a more efficient way.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

The following description is directed to various examples of the disclosure. The examples disclosed herein should not be interpreted, or otherwise used, as limiting the scope of the disclosure, including the claims. In addition, the following description has broad application, and the discussion of any example is meant only to be descriptive of that example, and not intended to indicate that the scope of the disclosure, including the claims, is limited to that example. In the foregoing description, numerous details are set forth to provide an understanding of the examples disclosed herein. However, it will be understood by those skilled in the art that the examples may be practiced without these details. While a limited number of examples have been disclosed, those skilled in the art will appreciate numerous modifications and variations therefrom. It is intended that the appended claims cover such modifications and variations as fall within the scope of the examples. Throughout the present disclosure, the terms "a" and "an" are intended to denote at least one of a particular element. In addition, as used herein, the term "includes" means includes but not limited to, the term "including" means including but not limited to. The term "based on" means based at least in part on.

Virtualization is a technology that enables executing a plurality of applications via software on hardware devices. It may refer to the creation of virtual machines that behave like real hardware with an operating system and allow applications to be executed therein. Some enterprises may use hardware, such as servers in a datacenter, to execute applications through a plurality of virtual machines allocated therein. Therefore, the allocation of the plurality of virtual machines in the servers of the datacenter may provide key value to enterprises, as the hardware computing resources may be used in a more efficient way.

Virtual Network Functions (VNF) is a technology that applies automation and virtualization techniques from Information Technology (IT) to move the current network functions in a network from dedicated hardware to general purpose of IT infrastructure. A VNF may comprise one or more Virtual Machines (VM) and virtual networks which in conjunction may implement the function of a network. VNF technology may provide flexibility to IT systems compared to IT applications using cloud technologies.

There is a challenge in allocating a VM in a datacenter. Datacenters comprise datacenter units (e.g., servers), each of these providing computing resources such as: Cores (C), Random Access Memory (RAM)®, Hard Disk (D), Non-Volatile Memory (NVM), Bandwidth (BW), and the like. In an example, a datacenter may comprise three servers (e.g., S1, S2, and S3) wherein each server provides its own computing resources (e.g., S1 provides C1, R1, D1, NVM1, and BW1; S2 provides C2, R2, D2, NVM2, and BW2; and S3 provides C3, R3, D3, NVM3, and BW3). On the other hand VMs consume computing resources such as: Cores (C), Random Access Memory (RAM)®, Hard Disk (D), Non-Volatile Memory (NVM), Bandwidth (BW), and the like. Depending on the requirements of the VMs, some VMs cannot be allocated on the same server, while other VMs must be allocated on the same server. This adds an additional level of complexity to the VM allocation in a datacenter while also maximizing the computing resources used.

As an illustrative example of the previous challenge, a datacenter comprise two datacenter units (S1 and S2) with 1000 GB of Hard Disk each. Three VM need to be allocated (VM1, VM2, and VM3); VM1 only requires 5 GB of Hard Disk, VM2 requires 700 GB of Hard Disk, and VM3 requires 350 GB of Hard Disk. In a first scenario there are no restrictions, therefore VM1 and VM2 could be allocated in S1 filling 705 GB from the 1000 GB, and VM3 could be allocated in S2 filling 350 GB from the 1000 GB. In a second scenario there is a restriction, VM1 is from one customer and, VM2 and VM3 are from a different customer, therefore adding the constraint that VM1 need to be allocated in a different datacenter unit than VM2, and VM3. In the second scenario, VM1 may be allocated in S1 filling 5 GB of 1000 GB (995 GB idle); then VM2 may be allocated in S2 filling 700 GB of 1000 GB (300 GB idle); and VM3 cannot be allocated in neither S1 (constraint that VM1 and VM3 cannot be allocated together) nor S2 (not enough Hard Disk idle space). Therefore, even though there is 1200 GB idle in the system VM3 that only require 350 GB cannot be allocated, therefore requiring a third datacenter unit (S3) of at least 350 GB of Hard Disk. The previous example is illustrative, therefore only including one variable (D), however as previously mentioned, datacenter units and VM may provide and require a plurality of computing resources (e.g., C, R, D, NVM, BW), therefore adding more complexity.

One example of the present disclosure provides a computing system for efficiently allocating VNFs in a datacenter by reducing the idle resources of the server. The computing system comprises a processing unit, a computation module, and an allocation module. The computation module is configured to determine an extinction factor corresponding to a datacenter unit in the datacenter based on a state of the datacenter and a VNF catalogue including a plurality of VNFs; and to develop an allocation model based on the determined extinction factor. The allocation module is configured to allocate a first VNF from the plurality of VNFs in the datacenter based on the allocation model.

Another example of the present disclosure provides a method for allocating VNFs in a datacenter. The disclosed method checks a current state of the datacenter by querying a datacenter database. The method further defines an extinction factor based on the VNF catalogue, the set of allocation rules, and the current state of the datacenter. The method determines an allocation model based on the VNF catalogue, the set of allocation rules, the extinction factor, and the current state of the datacenter. The method also receives a first VNF from the plurality of VNFs and allocates the first VNF in a datacenter unit based on the allocation model, wherein the datacenter unit is part of the datacenter.

Figure 1:
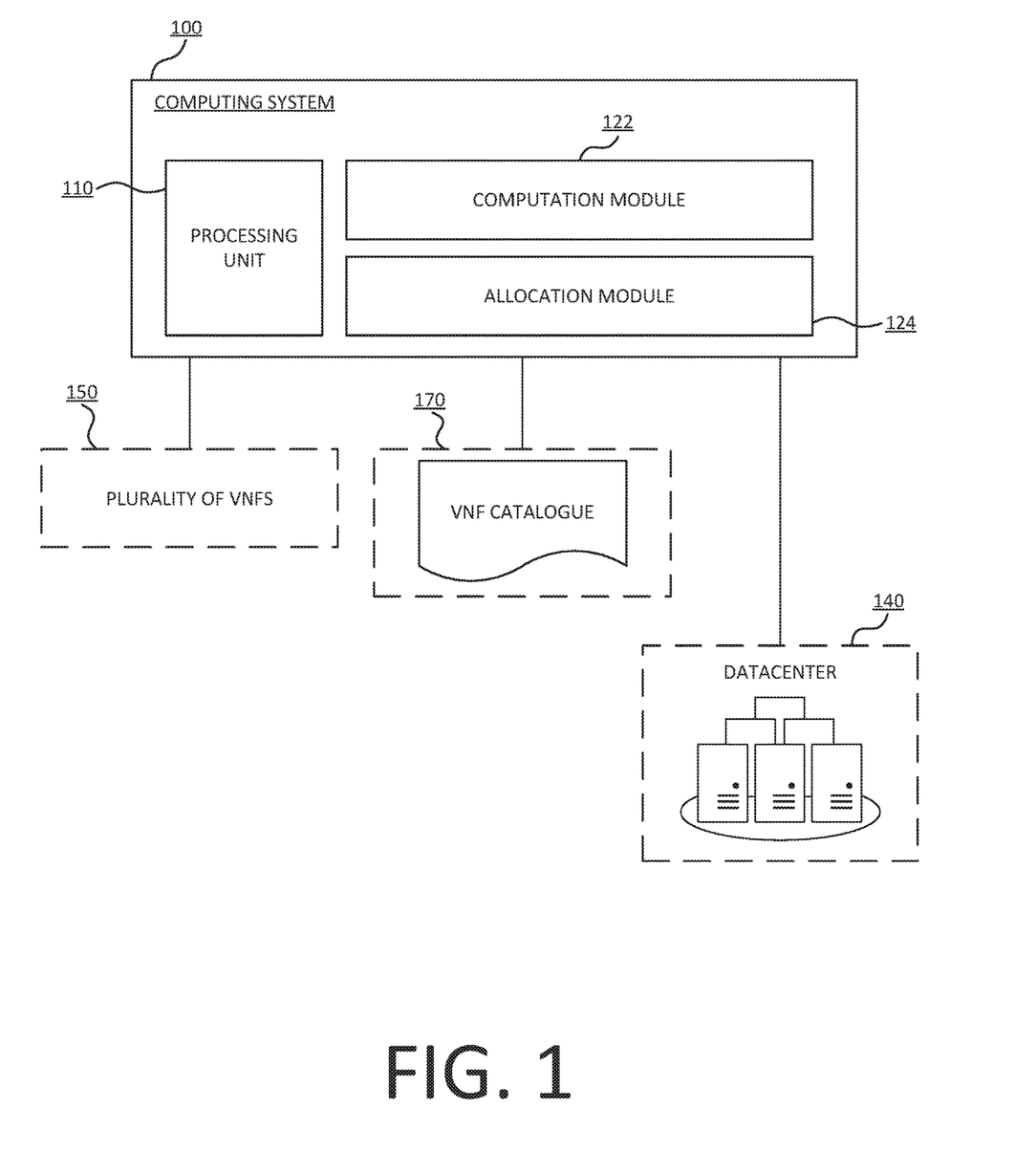
FIG. 1 is a block diagram illustrating an example of a computing system for allocating Virtual Network Functions in a datacenter.

Now referring to the drawings, FIG. 1 is a block diagram illustrating an example of a computing system for allocating Virtual Network Functions in a datacenter. The computing system 100 may comprise one or more processing units such as a CPU, a System on a Chip (SoC), a single processor, and the like. However, for clarity purposes the one or more processing units may be referred to as "the processing unit" hereinafter. The computing node 100 comprises a processing unit 110, a computation module 122, and an allocation module 124. The computing system 100 is connected to a plurality of VNFs 150, a VNF catalogue 170, and a datacenter 140. The datacenter 140 may comprise one or more datacenter units (e.g., servers). The computation module 122, and the allocation module 124 may be any combination of hardware and programming to implement the functionalities of the module described herein. In examples described herein, such combinations of hardware and programming may be implemented in a number of different ways. For example, the programming of modules may be a processor executable instructions stored on at least one non-transitory machine-readable storage medium and the hardware for modules may include at least one processor to execute those instructions. In some examples described herein, multiple modules may be collectively implemented by a combination of hardware and programming, as described above. In other examples, the functionalities of the computation module 122 and the allocation module 124 may be at least partially implemented in the form of electronic circuitry.

The computing system 100 receives a VNF catalogue 170 (see, e.g., VNF catalogue 370 described in FIG. 3) which is a file that indicates the incoming VNFs to the computing system 100 in sequential order. The next incoming VNF acknowledged by the VNF catalogue 170 will be referred hereinafter as the "first VNF". The first VNF comprises one or more VMs to be allocated in the datacenter 140.

The datacenter 140 comprise one or more datacenter units (e.g., servers). The computing system 100 may have a mechanism to access to the actual status of the datacenter 140 (see, e.g., datacenter database 230 from FIG. 2). The status of the datacenter indicates the available computing resources of the datacenter units within the datacenter 140. An example of datacenter status is shown in Table 1.

TABLE 1

| An example of datacenter status showing the available resources in each DC unit | | | | | |
|---|---|---|---|---|---|
| | S1 | S2 | S3 | ... | S_N |
| Core (C) | 1 | 3 | 0 | ... | 2 |
| RAM (R) | 200 GB | 500 GB | 125 GB | ... | 0 GB |
| HD (D) | 1000 GB | 5000 GB | 750 GB | ... | 4500 GB |
| NVM | 300 GB | 0 GB | 800 GB | ... | 1250 GB |
| Bandwidth (BW) | 450 Gbit/s | 600 Gbit/s | 100 Gbit/s | ... | 300 Gbit/s |

In table 1 example, system 100 acknowledges the available computing resources status of the datacenter 170. Datacenter 170 comprises a first datacenter unit (S1), a second datacenter unit (S2), up to a Nth datacenter unit (S_N), wherein N is a positive integer. Table 1 example comprises core, RAM, HD, NVM, and bandwidth as computing resources, however a different number and/or any other type of computing resources may be used. In the example disclosed, S1 has the following available computing resources: 1 core, 200 GB of RAM, 1000 GB of HD, 300 GB of NVM, and 450 Gbit/s of bandwidth; S2 has the following available computing resources: 3 cores, 500 GB of RAM, 5000 GB of HD, 0 GB of NVM, and 600 Gbit/s of bandwidth; S3 has the following available computing resources: 0 core, 125 GB of RAM, 750 GB of HD, 800 GB of NVM, and 100 Gbit/s of bandwidth; up to S_N has the following available computing resources: 2 cores, 0 GB of RAM, 4500 GB of HD, 1250 GB of NVM, and 600 Gbit/s of bandwidth. In the example S2 has no available NVM, S3 has no available core, and S_N has no available RAM.

Figure 3:
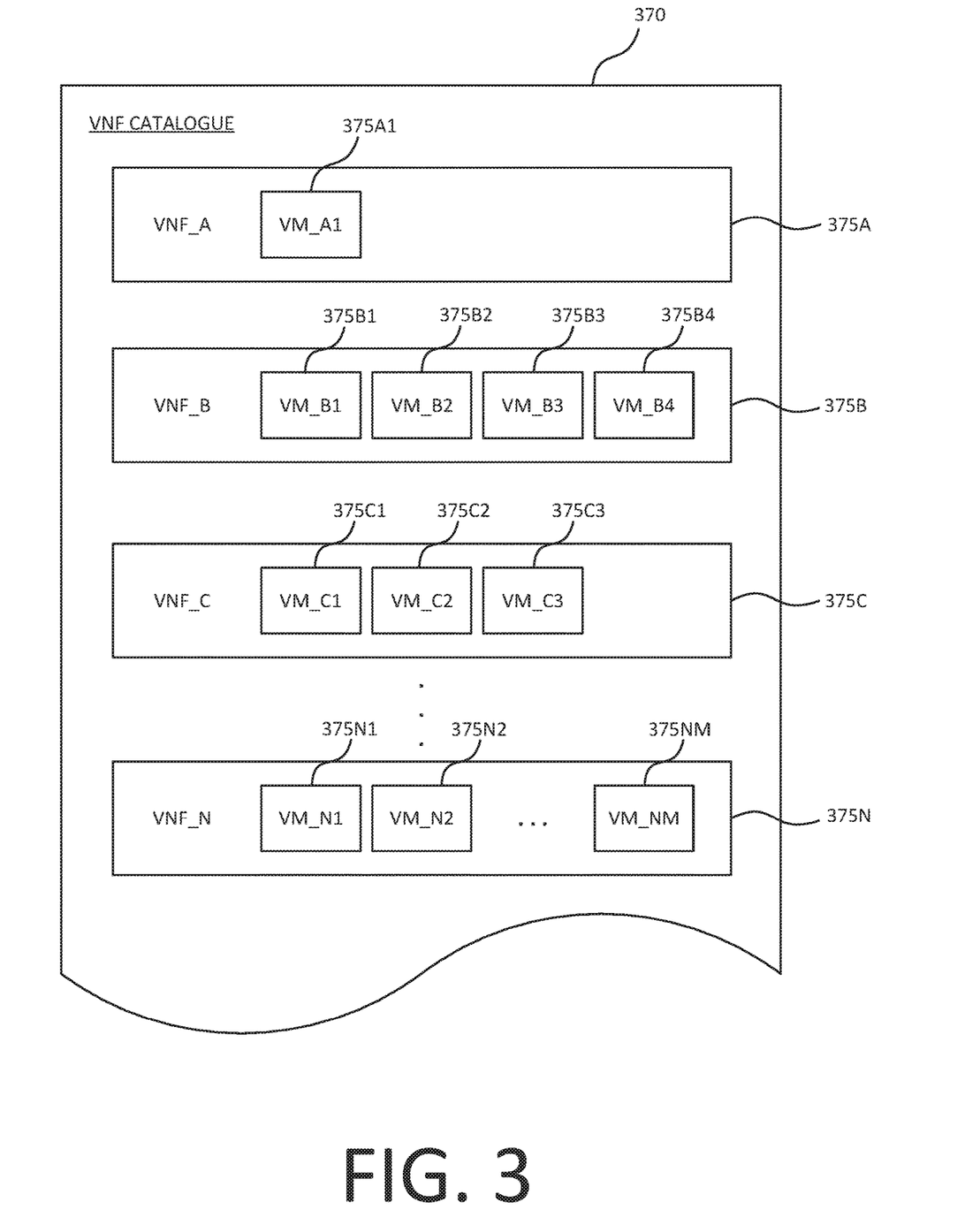
FIG. 3 is a block diagram illustrating an example of Virtual Network Functions catalogue.

The computation module 122 determines an extinction factor for each datacenter unit and the first VNF, based on the state of the datacenter (e.g., Table 1) and the VNF catalogue 170 (see, e.g., VNF catalogue 370 from FIG. 3). The extinction factor may indicate how many times the incoming VNF could be placed in a datacenter unit. For example, an extinction factor of 3 in S1 may indicate that the VNF could be placed three times in S1 or, in other words, that S1 has at least three times available resources as the computing resources VNF may consume. An example of extinction factor is shown in Table 2.

TABLE 2

An example of extinction factor over VNF1-N and S1-N

|       | S1 | S2 | S3 | ... | S_N |
|-------|----|----|----|-----|-----|
| VNF 1 | 1  | 3  | 0  | ... | 2   |
| VNF 2 | 5  | 1  | 19 | ... | 0   |
| VNF 3 | 0  | 5  | 3  | ... | 8   |
| ...   | ...| ...| ...| ... | ... |
| VNF_N | 8  | 0  | 7  | ... | 3   |

An extinction factor determination example is shown in Table 2. VNF1 could be placed a single time in S1, three times in S2, it cannot be placed in S3, and two times in S_N; VNF2 could be placed five times in S1, a single time in S2, nineteen times in S3, and cannot be placed in S_N; VNF3 cannot be placed in S1, could be placed five times in S2, three times in S3, and eight times in S_N; and VNF_N could be placed eight times in S1, cannot be placed in S2, seven times in S3, and three times in SN.

Even though the example disclosed in Table 2 calculates the extinction factor of the VNFs over the datacenter units, another embodiment of the present disclosure calculates the extinction factor of each of the VMs of each VNFs over the datacenter units.

The computation module 122 may further develop an allocation model based on the extinction factor determination. The allocation model may indicate in which datacenter unit to allocate the incoming VNFs and/or VMs once received by computing system 100. In one embodiment of the present disclosure, the incoming VNF/VM is selected to be stored in the datacenter unit that has the higher extinction factor (e.g., in Table 2 example, VNF 1 would be placed in S2 since it has an extinction factor of 3, the greatest among the datacenter units). In another example of the present disclosure it is chosen the datacenter unit that once the VNF/VM is allocated therein, extinct the allocation of a fewer number of VNF/VM. The term "extinct" may be understood as the datacenter unit status wherein a future VNF/VM may not be allocated therein because of unavailable computing resources reasons.

The allocation module 124 is configured to allocate each VNF from the plurality of VNFs in the datacenter based on the allocation model built by the computation module 122. In another embodiment, the allocation module 124 allocates each VM from each VNF from the plurality of VNFs in the datacenter based on the allocation model built by the computation module 122.

Figure 2:
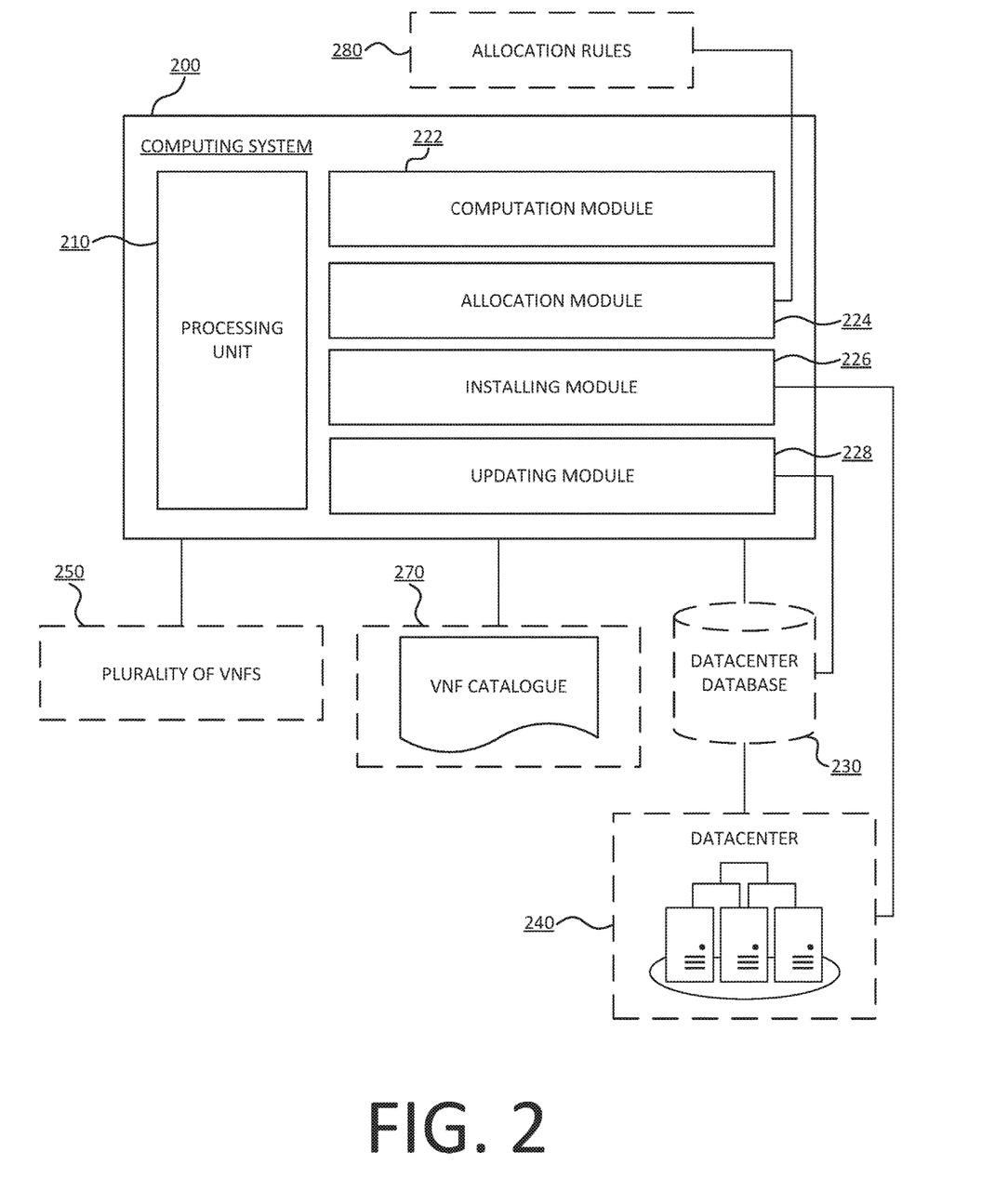
FIG. 2 is a block diagram illustrating an example of a computing system for allocating Virtual Network Functions in a datacenter using an installing module and an updating module.

FIG. 2 is a block diagram illustrating an example of a computing system for allocating Virtual Network Functions in a datacenter using an installing module and an updating module. The computing system 200 may comprise one or more processing units such as a CPU, a System on a Chip (SoC), a single processor, and the like. However, for clarity purposes the one or more processing units may be referred to as "the processing unit" hereinafter. The computing node 100 comprises a processing unit 210, a computation module 222, an allocation module 224, an installing module 226, and an updating module 224. The processing unit 210, the computation module 222, and the allocation module 224 may be the same or similar as the processing unit 110, the computation module 122, and the allocation module 124 from FIG. 1. The computing system 200 may be connected to a plurality of VNFs 250, a VNF catalogue 270, a set of allocation rules 280, a datacenter database 230, and a datacenter 240. The plurality of VNFs 250, the VNF catalogue 270, and the datacenter 240 may be the same or similar as the plurality of VNFs 150, the VNF catalogue 170, and the datacenter 140 from FIG. 1. The datacenter 240 may comprise one or more datacenter units (e.g., servers). The computation module 222, the allocation module 224, the installing module 226, and the updating module 228 may be any combination of hardware and programming to implement the functionalities of the module described herein. In examples described herein, such combinations of hardware and programming may be implemented in a number of different ways. For example, the programming of modules may be a processor executable instructions stored on at least one non-transitory machine-readable storage medium and the hardware for modules may include at least one processor to execute those instructions. In some examples described herein, multiple modules may be collectively implemented by a combination of hardware and programming, as described above. In other examples, the functionalities of the computation module 222, the allocation module 224 the installing module 226, and the updating module 228, may be at least partially implemented in the form of electronic circuitry.

The computing system 200 receives a VNF catalogue 270 (see, e.g., VNF catalogue 370 described in FIG. 3) which is a file that indicates the incoming VNFs to the computing system 200 in sequential order. The next incoming VNF acknowledged by the VNF catalogue 270 will be referred hereinafter as the "first VNF". The first VNF comprises one or more VMs to be allocated in the datacenter 240.

As mentioned above, each VNF comprises one or more VMs. The one or more VMs may require to be allocated in the datacenter 240 based on a set of allocation rules 280. The set of allocation rules 280 may comprise constraints to the allocation model. Some examples of allocation rules are: affinity rules, anti-affinity rules, server exclusion rules, and server update rules, or a combination thereof. The affinity rules define relationships between VNFs and VMs, for example, VM1 and VM2 may/must be stored in the same server, or VNF1 and VNF2 may/must be in the same rack; the affinity rules may not only apply to servers or racks but also to other resources such as VIM, zone, datacenter, etc. The anti-affinity rules define anti-relationships between VNFs and VMs, for example, VM1 and VM2 may/must not be stored in the same server, or VNF1 and VNF2 may/must not be stored in the same rack; the anti-affinity rules may not only apply to servers or racks but also to other resources such as VIM, zone, datacenter, etc. The server exclusion rules define relationships between VNFs and VMs, for example, server (S1) may only allocate VMs from a specific VNF (VNF1); the server exclusion rules may be used in a case an specific customer owns a server in the datacenter and do not want to share it with any other customer; the server exclusion rules may not only apply to servers but also to other resources such as VIM, racks, zone, datacenter, etc. The server update rules define relationships between other rules, for example, server (S1) can either allocate VM1 or VM2 therefore translating into update rules stating that once VM1 has been allocated, VM2 cannot be allocated anymore; and once VM2 has been allocated, VM1 cannot be allocated anymore. Even though the present disclosure focused on the affinity rules, anti-affinity rules, server exclusion rules, and server update rules; the set of allocation rules 280 may comprise any other rule or a combination of any other rule with the previously mentioned.

The datacenter 240 comprise one or more datacenter units (e.g., servers). The computing system 100 may further comprise a datacenter database 230 that contains the status of the datacenter units. The status of the datacenter indicates the available computing resources of the datacenter units within the datacenter 240. An example of the status of the datacenter units is shown in Table 1.

The set of allocation rules 280 and the VNF catalogue 270 are acknowledged by the computing system 200 before the first VNF is received. In one example of the present disclosure, the computation module 222 defines the affinity groups, anti-affinity groups or a combination thereof based on the VNF catalogue 270, that contain the incoming VNFs and VMs in sequential order, and the affinity rules and/or anti-affinity rules. The affinity groups indicate those VNFs/VM from the incoming VNFs (acknowledged based on the VNF catalogue 270) that comply with the affinity rules from the set of allocation rules 280, therefore indicating which VNF/VMs have to be stored in the same datacenter unit from the datacenter 240. On the contrary, the anti-affinity groups indicate those VNFs/VM from the incoming VNFs (acknowledged based on the VNF catalogue 270) that comply with the anti-affinity rules from the set of allocation rules 280, therefore indicating which VNF/VM may/must not be stored in the same datacenter unit.

The computation module 222 may further determine an extinction factor for each datacenter unit and the first VNF, based on the state of the datacenter 240 (e.g., Table 1), the VNF catalogue 270 (see, e.g., VNF catalogue 370 from FIG. 3), and the set of allocation rules (e.g., affinity rules/groups, anti-affinity rules/groups, etc.). The extinction factor may indicate how many times an affinity group (AG) could be placed in a datacenter unit taking into consideration the anti-affinity groups (A-AG). For example, an extinction factor of 3 in S1 may indicate that a first affinity group could be placed three times in S1 or, in other words, that S1 has at least three times available resources as the computing resources the first affinity group may consume. An example of extinction factor is shown in Table 3.

TABLE 3

An example of extinction factor over AG1-N and S1-N

| AG | A-AG | S1 | S2 | ... | S_N |
|---|---|---|---|---|---|
| AG1 | AG8, AG52 | 1 | 0 | ... | 3 |
| AG 2 | AG_N | 0 | 6 | ... | 0 |
| AG3 | — | 4 | 2 | ... | 11 |
| ... | ... | ... | ... | ... | ... |
| AG_N | AG2, AG69 | 3 | 9 | ... | 5 |

An extinction factor determination example is shown in Table 3. AG1 cannot be placed in the same datacenter unit (S1-S_N) as AG8 nor AG52; AG1 could be placed a single time in S1, it cannot be placed in S2, and three times in S_N; AG2 cannot be placed in the same datacenter unit (S1-S_N) as AG_N; AG2 cannot be placed in S1, it could be placed a six times in S2, and it cannot be placed in S_N. AG3 has not any anti-affinity; AG1 could be placed four times in S1, two times in S2, and eleven times in S_N. Up to AG_N which cannot be placed in the same datacenter unit (S1-S_N) as AG2 nor AG69; AG_N could be placed three times in S1, nine times in, and five times in SN.

The computation module 222 may further develop an allocation model based on the extinction factor determination. The allocation model may indicate in which datacenter unit to allocate each affinity group once received by computing system 200. In one embodiment of the present disclosure, the incoming affinity group (its VFN/VM) is selected to be stored in the datacenter unit that has the higher extinction factor (e.g., in Table 3 example, AG1 would be placed in S_N since it has an extinction factor of 3, the greatest among the datacenter units). In another example of the present disclosure it is chosen the datacenter unit that once the affinity group (e.g., AG1) is allocated therein, extinct the allocation of a fewer number of datacenter units towards other affinity groups. The term "extinct" may be understood as the datacenter unit status wherein a future incoming affinity groups may not be allocated therein because of unavailable computing resources reasons on top of the set of allocation rules 280.

One example of allocation model may be an allocation matrix matching the affinity groups and the plurality of datacenter units within the datacenter 240. One example of allocation matrix is shown in Table 4.

TABLE 4

An example of allocation matrix over AG1-N and S1-N

| AG | S1 | S2 | S3 | ... | S_N |
|---|---|---|---|---|---|
| AG1 | — | — | X | ... | — |
| AG2 | — | — | — | ... | X |
| AG3 | X | — | — | ... | — |
| ... | ... | ... | ... | ... | ... |
| AG_M | — | X | — | ... | — |

An example of allocation matrix is shown in Table 4 matching the allocation of a plurality of affinity groups (AG1-AG_M) to a plurality of datacenter units (S1-S_N) in a datacenter (e.g., datacenter 240); wherein N and M are positive integers. The allocation matrix from Table 4 determines that AG1 may be allocated in S3, AG2 may be allocated in S_N, AG3 may be allocated in S1, and AG_M may be allocated in S2.

The allocation module 224 is configured to allocate each affinity group in the datacenter 240 based on the allocation model built by the computation module 222. In another embodiment, the allocation module 224 is configured to allocate each VNF from the plurality of VNFs in the datacenter 240 based on the allocation model built by the computation module 222. In another embodiment, the allocation module 224 is configured to allocate each VM from each VNF from the plurality of VNFs in the datacenter 240 based on the allocation model built by the computation module 222.

The installing module 226 is configured to install each affinity group in the datacenter 240 based on the allocation model built by the computation module 222. In another embodiment, the installing module 226 is configured to install each VNF from the plurality of VNFs in the datacenter 240 based on the allocation model built by the computation module 222. In another embodiment of the present disclosure, the installing module 226 is configured to install each VM from each VNF from the plurality of VNFs in the datacenter 240 based on the allocation model built by the computation module 222.

The updating module 228 is configured to update the allocation model and the datacenter database 230 with the installation of the affinity group in the datacenter 240. In another embodiment, the updating module 228 is configured to update the allocation model and the datacenter database 230 with the installation of the VNF from the plurality of VNFs in the datacenter 240. In another embodiment of the present disclosure, the updating module 228 is configured to update the allocation model and the datacenter database 230 with the installation of the each VM from each VNF from the plurality of VNFs in the datacenter 240.

FIG. 3 is a block diagram illustrating an example of a Virtual Network Functions catalogue. The VNF catalogue 370 may be a file that contains the incoming VNFs information to a computing system (e.g., computing system 100 from FIG. 1, and computing system 200 of FIG. 2) in sequential order. The VNF catalogue 370 may be the same or similar as the VNF catalogue 170 from FIG. 1, and VNF catalogue 270 from FIG. 2.

The VNF catalogue 370 is a file that contains a first VNF_A 375A, a second VNF_B 375B, a third VNF_C 375C, up to a Nth VNF_N 375N; wherein N is a positive integer. The VNF catalogue 370 may also contain the information of which VMs are in the VNFs. The VNF catalogue 370 may contain that the first VNF_A 375A contains a single VM: VM_A1 375A1. The VNF catalogue 370 may also contain that the second VNF_B 375B contains four VMs: VM_B1 375B1, VM_B2 375B2, VM_B3 375B3, and VM_B4 375B4. The VNF catalogue 370 contains that the second VNF_C 375C contains three VMs: VM_C1 375C1, VM_C2 375C2, and VM_C3 375C3. The VNF catalogue 370 may also contain that the Nth VNF_N 375N contains M VMs: VM_N1 375N1, VM_N2 375N2, up to VM_NM 375NM, wherein M is a positive integer.

Figure 4:
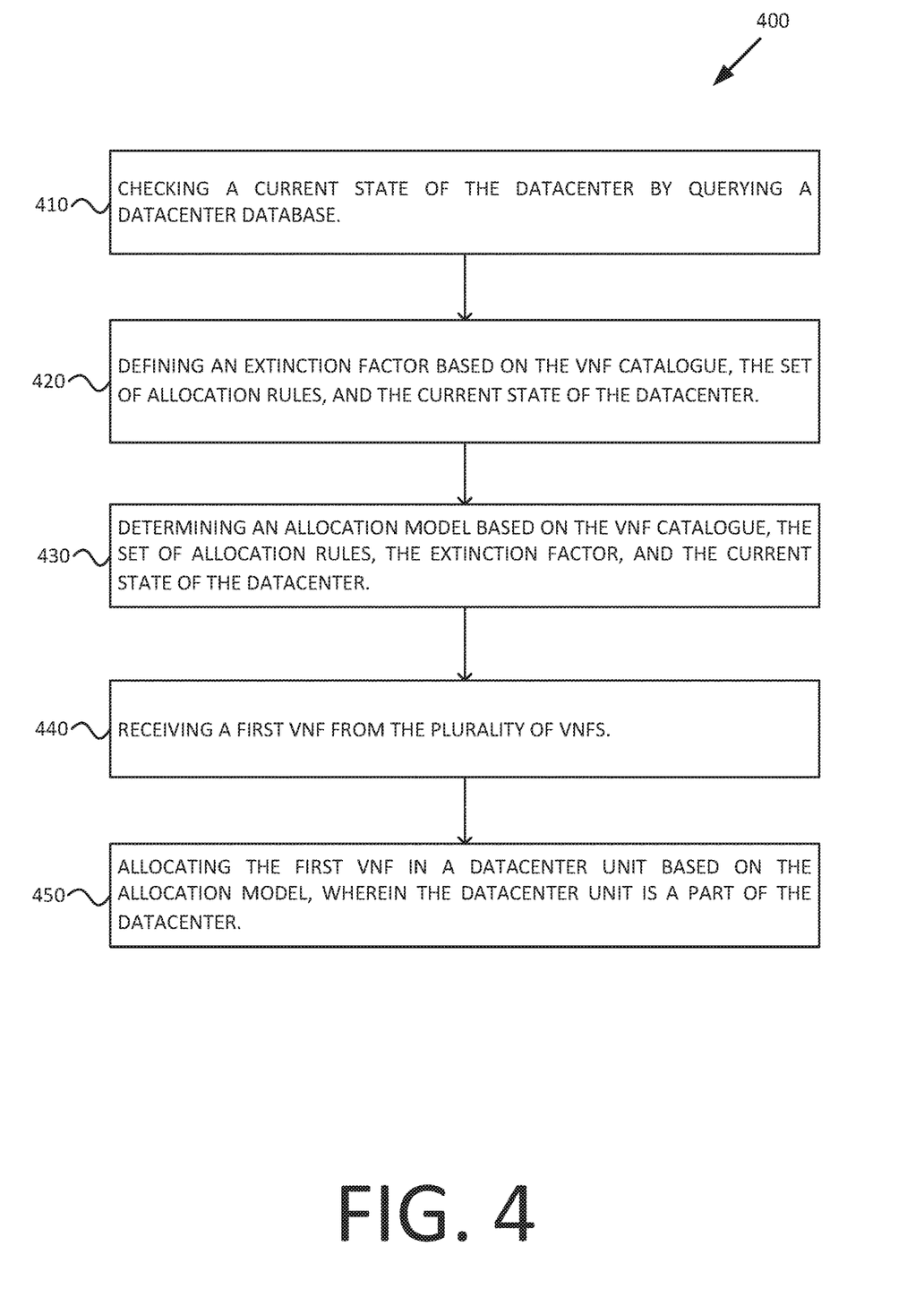
FIG. 4 is a flowchart of an example method for allocating Virtual Network Functions in a datacenter.

FIG. 4 is a flowchart of an example method for allocating Virtual Network Functions in a datacenter. The method 400 may be performed by one or more processing units such as a CPU, a SoC, a single processor and the like. For clarity purposes, the at least one processing units may be referred to as "a processor" or "the processor" hereinafter. Method 400 receives a VNF catalogue, and a set of allocation rules, wherein the VNF catalogue indicates a plurality of VNFs. The VNF catalogue and the set of allocation rules may be the same or similar as the VNF catalogue 170 from FIG. 1, or the VNF catalogue 270 and the set of allocation rules 280 from FIG. 2. Method 400 is performed for each of the incoming VNFs, however, for clarity purposes and with no aim of restricting the scope of the present disclosure, only one incoming VNF (e.g., the first VNF from the plurality of VNFs) execution is disclosed. Method 400 may be implemented, for example, by system 100 from FIG. 1. Method 400 may also be implemented, for example, by system 200 from FIG. 2. Method 400 as well as the methods described herein can, for example, be implemented in the form of machine readable instructions stored on a memory of a computing system (e.g., implementation of instructions 641-646 of system 600 from FIG. 6), in the form of electronic circuitry or another suitable form. The method 400 comprises a plurality of blocks to be performed.

At block 410, the system (e.g., computing system 100 from FIG. 1, and computing system 200 from FIG. 2) checks a current state of the datacenter (e.g., datacenter 240 from FIG. 2) by querying a datacenter database (e.g., datacenter database 230 from FIG. 2).

At block 420, the system defines an extinction factor based on the VNF catalogue (e.g., VNF catalogue 270 from FIG. 2), the set of allocation rules (e.g., the set of allocation rules 280 from FIG. 2), and the current state of the datacenter.

At block 430, the system determines an allocation model based on the VNF catalogue, the set of allocation rules, and the current state of the datacenter.

At block 440, the system receives a first VNF from the plurality of VNFs (e.g., plurality of VNFs 150 from FIG. 1).

At block 450, the system allocates the first VNF in a datacenter unit based on the allocation model, wherein the datacenter unit is a part of the datacenter.

Figure 5:
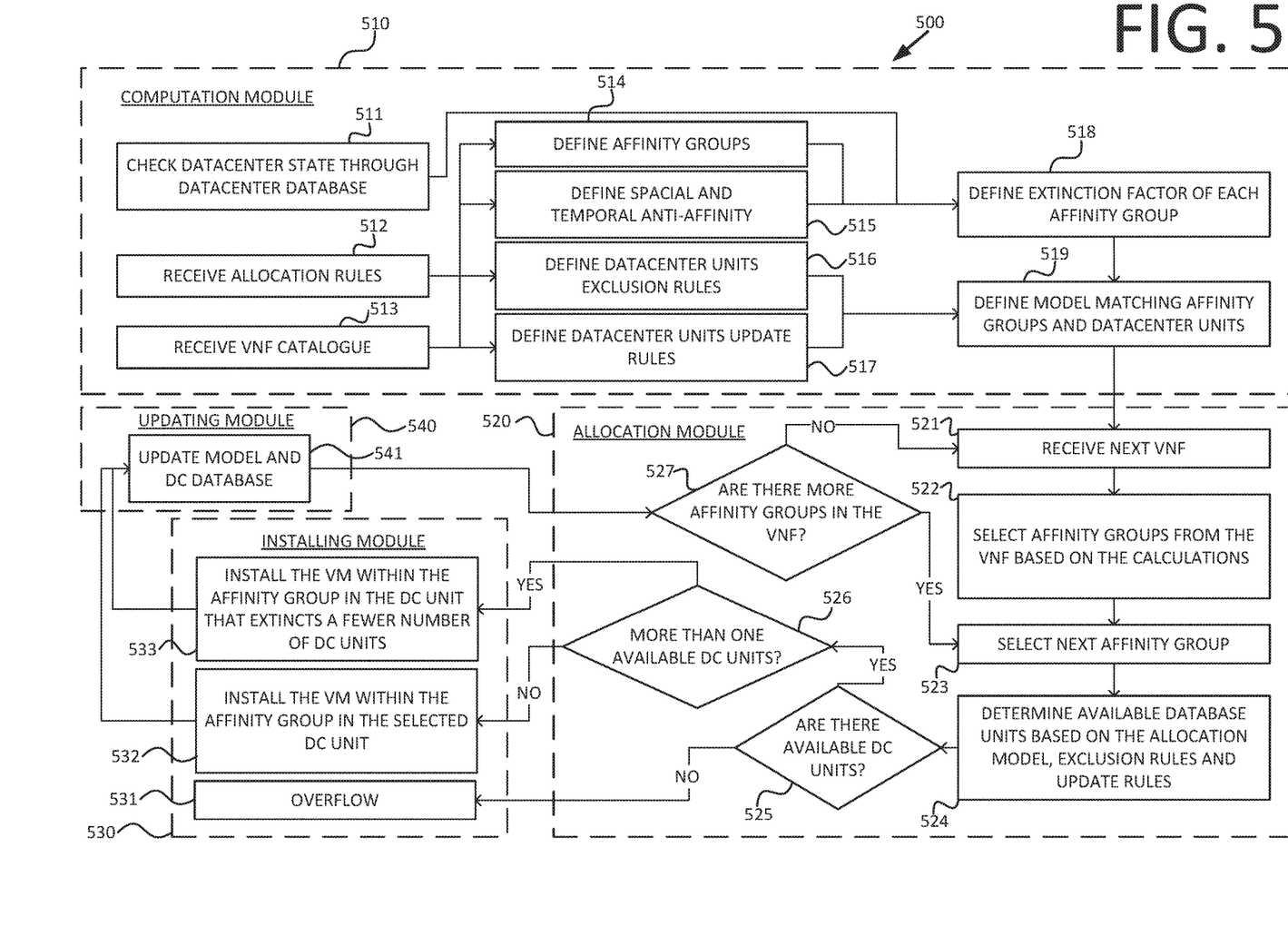
FIG. 5 is a flowchart of another example method for allocating Virtual Network Functions in a datacenter.

FIG. 5 is a flowchart of another example method for allocating Virtual Network Functions in a datacenter. The method 500 may be performed by one or more processing units such as a CPU, a SoC, a single processor and the like. For clarity purposes, the at least one processing units may be referred to as "a processor" or "the processor" hereinafter. Method 500 receives a VNF catalogue, and a set of allocation rules, wherein the VNF catalogue indicates a plurality of VNFs. The VNF catalogue and the set of allocation rules may be the same or similar as the VNF catalogue 170 from FIG. 1, or the VNF catalogue 270 and the set of allocation rules 280 from FIG. 2. Method 400 is performed for each of the incoming VNFs, however, for clarity purposes and with no aim of restricting the scope of the present disclosure, only one incoming VNF (e.g., the first VNF from the plurality of VNFs) execution is disclosed. Method 500 may be implemented, for example, by system 100 from FIG. 1. Method 500 may also be implemented, for example, by system 200 from FIG. 2. Method 500 as well as the methods described herein can, for example, be implemented in the form of machine readable instructions stored on a memory of a computing system (e.g., implementation of instructions 641-646 of system 600 from FIG. 6), in the form of electronic circuitry or another suitable form. The method 500 comprises a plurality of blocks to be performed.

In block 511, the computation module 510 may check the datacenter (e.g., datacenter 240 from FIG. 2) state by querying the datacenter database (e.g., datacenter database 230 from FIG. 2). In block 512, the computation module 510 may receive a set of allocation rules (e.g., set of allocation rules 280 from FIG. 2). In block 513, the computation module 510 may receive a VNF catalogue (e.g., VNF catalogue 270 from FIG. 2). Blocks 511-513 may be performed in parallel or in sequential order.

Once the computation module 510 receives the set of allocation rules and the VNF catalogue the computation module may define at block 514 the affinity groups, at block 515 the anti-affinity groups, at block 516 the datacenter exclusion rules, and at block 517 the datacenter units updating rules.

Once the computation module 510 checked the database state (block 511), and defined the affinity groups (block 514) and the anti-affinity groups (block 515); the computation module 510 may define at block 518 the extinction factor of each affinity group.

Once the computation module 510 has defined the extinction factor of each affinity group (block 518), the datacenter units exclusion rules (block 516), and the datacenter units update rules (block 517); the computation module 510, at block 519, may define an allocation model matching the affinity groups and the datacenter units (e.g., allocation matrix of Table 4).

Once the computation module 510 has defined the allocation model, the allocation module at block 521 may receive the next VNF and select (block 522) the affinity groups from the received VNF based on the prior calculations. At block 523, the allocation module 520 may select the next affinity group and determine (block 524) the available datacenter units based on the allocation model, exclusion rules, and update rules. Then at decision block 525 it is checked if there are available datacenter units (e.g., available servers in the datacenter 240 from FIG. 2). If there are not available datacenter units (NO branch of decision block 525), the installing module 530 may determine that there is an overflow and the affinity group (and its VMs) may not be allocated in the datacenter. If there are available datacenter units (YES branch of decision block 525), the allocation module 520 may perform decision block 526.

At decision block 526, the allocation module 520 may check if there are more than one available datacenter units to allocate the affinity group (affinity group selected in block 523). If there is a single available datacenter unit to allocate the affinity group (NO branch of decision block 526), the installing module 530 may install, in block 532, the VM within the affinity group in the selected datacenter unit. In the case that there are more than one available datacenter unit to allocate the affinity group (YES branch of decision block 526), the installing module 530 may install, in block 533, the VM within the affinity group in the datacenter unit that extinct a fewer number of datacenter units.

After a VM is installed in a datacenter unit by the installing module 530 (blocks 532 or 533), the updating module 540 may update (block 541) the allocation model and the datacenter database with the installation information. Once, the updating module 540 updated the model and the datacenter matrix (block 541), the allocation module 520 may perform decision block 527 by checking whether there are more affinity groups in the VNF (VNF received in block 521). If there are more affinity groups in the VNF (YES branch of decision block 527), the allocation module 520 may select (block 523) the next affinity group and may continue with the above mentioned method. If there are not any more affinity group in the VNF (NO branch of decision block 527), the allocation module 520 may wait and receive (block 521) the next VNF and may continue with the above mentioned method.

Figure 6:
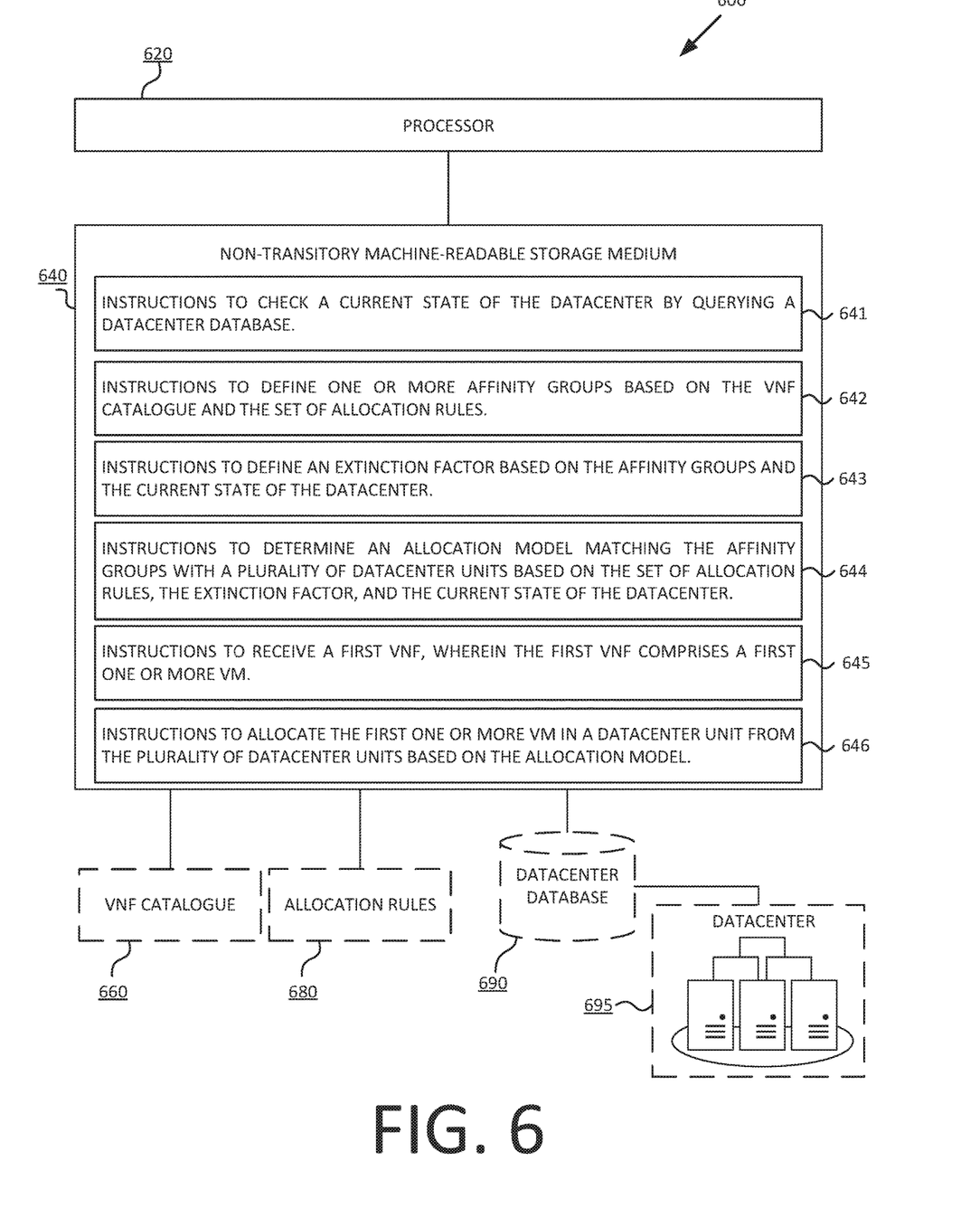
FIG. 6 is a block diagram illustrating an example of a computing system for allocating Virtual Network Functions in a datacenter.

FIG. 6 is a block diagram illustrating an example of a computing system for allocating Virtual Network Functions in a datacenter. FIG. 6 describes a system 600 that includes a physical processor 620 and a non-transitory machine-readable storage medium 640. The processor 620 may be a microcontroller, a microprocessor, a central processing unit (CPU) core, an application-specific-integrated circuit (ASIC), a field programmable gate array (FPGA), and/or the like. The machine-readable storage medium 640 may store or be encoded with instructions 641-646 that may be executed by the processor 620 to perform the functionality described herein. System 600 hardware may be the same or similar as the hardware in system 100 of FIG. 1. System 600 hardware may be the same or similar as the hardware in system 200 of FIG. 2. System 1200 may use the method 400 of FIG. 4. System 600 may use the method 500 of FIG. 5. System 600 may be connected to a VNF catalogue 660. The VNF catalogue 660 may be the same or similar as the VNF catalogue 370 from FIG. 3. System 600 may be further connected to a set of allocation rules 680. The set of allocation rules 680 may be the same or similar as the set of allocation rules 280 from FIG. 2. System 600 may be further connected to a datacenter database 690 which contains the state information of the datacenter units from datacenter 695. The datacenter database 690 and the datacenter 695 may be the same or similar to the datacenter 140 from FIG. 1, or the datacenter database 230 and the datacenter 240 from FIG. 2.

In an example, the instructions 641-646, and/or other instructions can be part of an installation package that can be executed by the processor 620 to implement the functionality described herein. In such case, non-transitory machine readable storage medium 640 may be a portable medium such as a CD, DVD, or flash device or a memory maintained by a computing device from which the installation package can be downloaded and installed. In another example, the program instructions may be part of an application or applications already installed in the non-transitory machine-readable storage medium 640.

The non-transitory machine readable storage medium 640 may be an electronic, magnetic, optical, or other physical storage device that contains or stores executable data accessible to the system 600. Thus, non-transitory machine readable storage medium 640 may be, for example, a Random Access Memory (RAM), an Electrically Erasable Programmable Read-Only Memory (EEPROM), a storage device, an optical disk, and the like. The non-transitory machine readable storage medium 640 does not encompass transitory propagating signals. Non-transitory machine readable storage medium 640 may be allocated in the system 600 and/or in any other device in communication with system 600.

In the example of FIG. 6, the instructions 641, when executed by the processor 620, cause the processor 620 to check a current state of the datacenter 695 by querying a datacenter database 690.

The system 600 may further include instructions 642 that, when executed by the processor 620, cause the processor 620 to define one or more affinity groups based on the VNF catalogue 660 and the set of allocation rules 680.

The system 600 may further include instructions 643 that, when executed by the processor 620, cause the processor 620 to define an extinction factor based on the affinity groups and the current state of the datacenter 695.

The system 600 may further include instructions 644 that, when executed by the processor 620, cause the processor 620 to determine an allocation model matching the affinity groups with a plurality of datacenter units based on the set of allocation rules 680, the extinction factor, and the current state of the datacenter 695.

The system 600 may further include instructions 645 that, when executed by the processor 620, cause the processor 620 to receive a first VNF, wherein the first VNF a first one or more VM.

The system 600 may further include instructions 646 that, when executed by the processor 620, cause the processor 620 to allocate the first one or more VM in a datacenter unit from the plurality of datacenter units based on the allocation model.

The system 600 may further include additional instructions that, when executed by the processor 620, cause the processor 620 to install the first VNF in the datacenter unit.

The system 600 may further include additional instructions that, when executed by the processor 620, cause the processor 620 to update the allocation model.

The system 600 may further include additional instructions that, when executed by the processor 620, cause the processor 620 to update the datacenter database 690.

The above examples may be implemented by hardware or software in combination with hardware. For example the various methods, processes and functional modules described herein may be implemented by a physical processor (the term processor is to be interpreted broadly to include CPU, processing module, ASIC, logic module, or programmable gate array, etc.). The processes, methods and functional modules may all be performed by a single processor or split between several processors; reference in this disclosure or the claims to a "processor" should thus be interpreted to mean "at least one processor". The processes, methods and functional modules are implemented as machine readable instructions executable by at least one processor, hardware logic circuitry of the at least one processors, or a combination thereof.

The drawings in the examples of the present disclosure are some examples. It should be noted that some units and functions of the procedure are not necessarily essential for implementing the present disclosure. The units may be combined into one unit or further divided into multiple sub-units. What has been described and illustrated herein is an example of the disclosure along with some of its variations. The terms, descriptions and figures used herein are set forth by way of illustration. Many variations are possible within the spirit and scope of the disclosure, which is intended to be defined by the following claims and their equivalents.

What is claimed is:

1. A computing system comprising:
   a processor; and
   a non-transitory computer readable medium including instructions that, when executed by the processor, causes the processor to:
      develop an allocation model according to a catalogue to allocate at least one Virtual Network Function (VNF) entity of a VNF of a plurality of VNFs to at least one of a plurality of datacenter units of a datacenter, wherein the catalogue comprises a file indicating the plurality of VNFs that are incoming to the computing system in a sequential order;
      determine a status of each of the datacenter units of the datacenter based on the allocation model, the statuses comprising extinction factors corresponding to available resources of the datacenter units at the datacenter;
      allocate, by an allocation module, the VNF entity to the at least one datacenter unit of the plurality of datacenter units comprising a status with an extinction factor corresponding to a highest number of available resources.

2. The computing system of claim 1, the computer readable medium further comprising instructions to, based on the allocation of the VNF entity to the at least one data center unit, determine an updated extinction factor corresponding to the data center unit.

3. The system of claim 1, wherein the computer readable medium further comprises instructions to determine the extinction factor for each datacenter unit in the datacenter.

4. The system of claim 1, wherein the allocate the VNF entity to the at least one datacenter unit of the plurality of datacenter units comprising a status with the highest number of available resources is based on a set of allocation rules comprising at least one of affinity rules, anti-affinity rules, or a combination thereof.

5. The system of claim 4, wherein each VNF from the plurality of VNFs comprises one or more Virtual Machines (VMs), wherein the computer readable medium further comprises instructions to define affinity groups, anti-affinity groups, or a combination thereof, based on the plurality of VNFs, and the at least one of affinity rules, and anti-affinity rules, wherein the affinity groups and anti-affinity groups define related VMs and unrelated VMs, respectively, of the VNFs.

6. The system of claim 5, wherein the computer readable medium further comprises instructions to define an extinction factor for each affinity group.

7. The system of claim 6, wherein the allocation model is an allocation matrix matching the affinity groups and the plurality of datacenter units, wherein the datacenter units are entities that form the datacenter and each datacenter unit comprises one or more types of available resources.

8. The system of claim 1, wherein the allocate the VNF entity to the at least one datacenter unit of the plurality of datacenter units comprising a status with the highest number of available resources is based on a set of allocation rules comprising at least one of server exclusion rules, server update rules, or a combination thereof.

9. The system of claim 1, wherein the computer readable medium further comprising instructions to install the VNF in the datacenter based on the allocation of the VNF entity.

10. The system of claim 9, wherein the computer readable medium further comprising instructions to update the allocation model with the installation of the VNF in the datacenter.

11. The computing system of claim 1, the computer readable medium further comprising instructions to, based on the statuses of the datacenter units of the datacenter, determine a state of the datacenter.

12. A non-transitory machine-readable medium storing machine-readable instructions executable by a physical processor, the instructions causing the processor to:
   receive a Virtual Network Functions (VNF) catalogue comprising a list of at least one VNF to be allocated to a datacenter;
   responsive to receiving the VNF catalogue, determine a current state of the datacenter, the state defined by a plurality of determined extinction factors for a plurality of datacenter units in the datacenter, the plurality of extinction factors indicating resource availability of the plurality of datacenter units, the VNF catalogue comprising a file indicating the list of the at least one VNF incoming to the processor in a sequential order;
   develop an allocation model based on the VNF catalogue and the current state of the datacenter, the allocation model indicating an allocation of at least one VNF to the plurality of datacenter units; and
   allocate the at least one VNF to the datacenter unit based on the allocation model, wherein for a VNF entity within the VNF to be allocated in multiple datacenter units of the plurality of datacenter units, an allocation module is configured to allocate the VNF entity in one or more of the multiple datacenter units that comprises an extinction factor indicating a highest number of available resources.

13. The computer readable medium of claim 12, further comprising instructions to, in response to the allocation of the VNF to the datacenter unit, define an updated extinction factor for the datacenter unit.

14. The computer readable medium of claim 12, wherein the allocation model is further determined based on a set of allocation rules that comprise at least one of compulsory or preferred spatial relationships of the plurality of VNFs in the datacenter.

15. The computer readable medium of claim 14, wherein the set of allocation rules further comprises at least one of affinity rules, anti-affinity rules, server exclusion rules, server update rules, or a combination thereof.

16. The computer readable medium of claim 15, wherein each VNF of the list of VNF comprises one or more Virtual Machine (VM), and further comprising instructions to define at least one of affinity groups, anti-affinity groups, or a combination thereof based on the VNF catalogue, and the at least one of affinity rules and anti-affinity rules, wherein the method further defines an extinction factor of each affinity group.

17. The computer readable medium of claim 12, wherein each VNF from the plurality of VNFs comprises one or more Virtual Machines (VM) to be allocated in the datacenter.

18. A method comprising:
   checking a current state of a datacenter by querying a datacenter database;

defining one or more affinity groups based on a Virtual Network Functions (VNF) catalogue and a set of allocation rules, the one or more affinity groups defining compulsory and preferred spatial relationships of a plurality of incoming VNFs and one or more Virtual Machines (VMs) in the datacenter, the VNF catalogue comprising a file indicating the plurality of incoming VNFs in a sequential order;

defining an extinction factor for each of a plurality of datacenter units in the datacenter based on the affinity groups and the current state of the datacenter, each extinction factor indicating resource availability of one of the plurality of datacenter units;

developing an allocation model matching the one or more VMs with the plurality of datacenter units based on the set of allocation rules, each defined extinction factor, and the current state of the datacenter;

receiving a first VNF, wherein the first VNF comprises a first one or more VM; and allocating the first one or more VM to a selected datacenter unit from the plurality of datacenter units based on the allocation model, wherein the selected datacenter unit comprises a first extinction factor indicating a highest number of available resources.

19. The method of claim 18, wherein for a VM within the first VNF to be allocated in multiple datacenter units of the plurality of datacenter units, an allocation module is configured to allocate the VM in one or more of the multiple datacenter units that includes a second extinction factor indicating a fewest number of VNFs and within the one or more affinity groups.

20. The method of claim 18, further comprising defining an updated extinction factor for the selected datacenter unit reflecting the allocation of the first one or more Virtual Machine (VM) to the selected datacenter unit.

* * * * *